(12) United States Patent
Froeller et al.

(10) Patent No.: US 9,301,004 B2
(45) Date of Patent: Mar. 29, 2016

(54) SYSTEM AND METHOD FOR REPRODUCING FIRST REPRODUCTION DATA AND AT LEAST SECOND REPRODUCTION DATA, COMPUTER PROGRAM AND COMPUTER PROGRAM PRODUCT

(71) Applicants: Patrick Froeller, Wiener Neustadt (AT); Dominik Karall, Vienna (AT); Wolfgang Wirths, Bonn (DE)

(72) Inventors: Patrick Froeller, Wiener Neustadt (AT); Dominik Karall, Vienna (AT); Wolfgang Wirths, Bonn (DE)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 14/369,207

(22) PCT Filed: Dec. 21, 2012

(86) PCT No.: PCT/EP2012/005326
§ 371 (c)(1),
(2) Date: Jun. 27, 2014

(87) PCT Pub. No.: WO2013/097941
PCT Pub. Date: Jul. 4, 2013

(65) Prior Publication Data
US 2014/0359687 A1 Dec. 4, 2014

(30) Foreign Application Priority Data
Dec. 30, 2011 (DE) .......................... 10 2011 122 621

(51) Int. Cl.
*H04N 7/173* (2011.01)
*H04N 21/435* (2011.01)
(Continued)

(52) U.S. Cl.
CPC ............. *H04N 21/435* (2013.01); *H04H 60/80* (2013.01); *H04N 21/266* (2013.01); *H04N 21/4126* (2013.01); *H04N 21/478* (2013.01); *H04N 21/4758* (2013.01); *H04N 21/64322* (2013.01); *H04N 21/8545* (2013.01)

(58) Field of Classification Search
CPC .......... H04N 21/4622; H04N 21/8586; H04N 7/17318
USPC ........... 725/93, 109–116, 131–134, 139–142; 709/217–232; 348/734
See application file for complete search history.

(56) References Cited

U.S. PATENT DOCUMENTS 6,208,387 B1 * 3/2001 Magnusson ............ H04N 5/272
345/629
6,640,145 B2 * 10/2003 Hoffberg ........... G05B 19/0426
700/17

(Continued)

FOREIGN PATENT DOCUMENTS

DE        4313107 C1     4/1994
DE    102004045481 A1    3/2006

*Primary Examiner* — Annan Shang
(74) *Attorney, Agent, or Firm* — Leydig, Voit & Mayer, Ltd.

(57) ABSTRACT

A system for reproducing first reproduction data and for reproducing second reproduction data includes: a first reproduction device, configured for reproducing the first reproduction data; and a second reproduction device, configured for reproducing the second reproduction data. The system is configured such that the first reproduction data is transmitted to the first reproduction device via a first logical communication channel and the second reproduction data is transmitted to the second reproduction device via a second logical communication channel. The second logical communication channel is different from the first logical communication channel. The system is configured such that the first reproduction data is identified using pattern recognition, and determination of the second reproduction data is based on the identification of the first reproduction data.

15 Claims, 1 Drawing Sheet

(51) Int. Cl.
*H04H 60/80* (2008.01)
*H04N 21/266* (2011.01)
*H04N 21/41* (2011.01)
*H04N 21/475* (2011.01)
*H04N 21/478* (2011.01)
*H04N 21/643* (2011.01)
*H04N 21/8545* (2011.01)

(56) References Cited

U.S. PATENT DOCUMENTS

| | | | |
|---|---|---|---|
| 6,771,316 B1* | 8/2004 | Iggulden | H04N 5/44 348/460 |
| 2002/0120925 A1* | 8/2002 | Logan | A23L 1/3002 725/9 |
| 2006/0155398 A1* | 7/2006 | Hoffberg | G05B 15/02 700/86 |
| 2006/0200253 A1* | 9/2006 | Hoffberg | G05B 15/02 700/19 |
| 2007/0124775 A1 | 5/2007 | DaCosta | |
| 2008/0256586 A1 | 10/2008 | Illgner-Fehns et al. | |
| 2009/0046686 A1* | 2/2009 | Izaki | H04W 8/20 370/338 |
| 2009/0063263 A1* | 3/2009 | Krantz | G06Q 30/02 705/14.65 |
| 2011/0145874 A1* | 6/2011 | Bi | H04N 21/478 725/110 |

\* cited by examiner

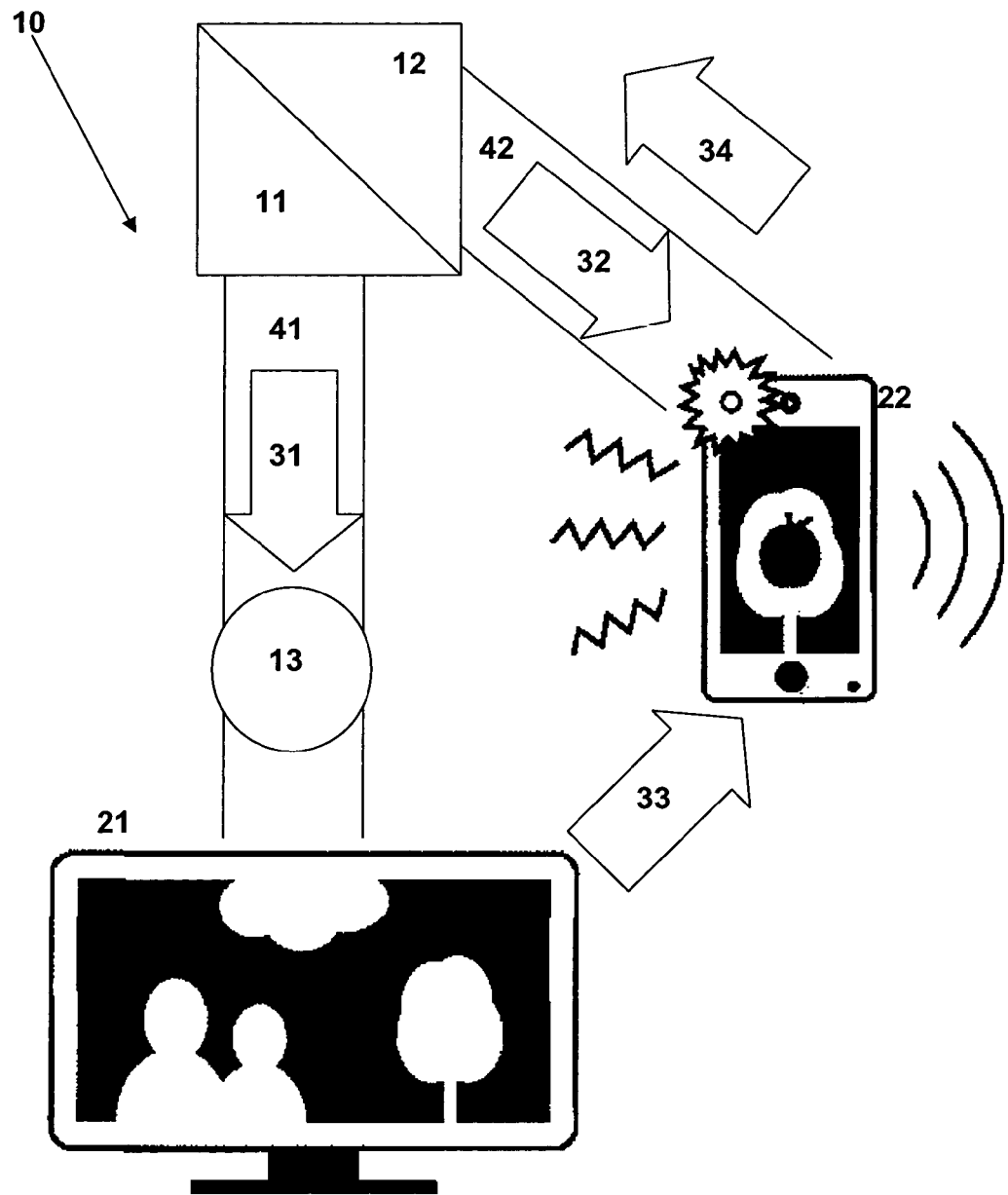

SYSTEM AND METHOD FOR REPRODUCING FIRST REPRODUCTION DATA AND AT LEAST SECOND REPRODUCTION DATA, COMPUTER PROGRAM AND COMPUTER PROGRAM PRODUCT

CROSS-REFERENCE TO RELATED APPLICATIONS

This application is a U.S. National Phase application under 35 U.S.C. §371 of International Application No. PCT/EP2012/005326, filed on Dec. 21, 2012, and claims benefit to German Patent Application No. DE 10 2011 122 621.8, filed on Dec. 30, 2011. The International Application was published in English on Jul. 4, 2013 as WO 2013/097941 under PCT Article 21(2).

FIELD

The invention relates to a system for reproducing first reproduction data and for reproducing second reproduction data, wherein the system comprises a first reproduction device and at least one second reproduction device, wherein the first reproduction device is configured for reproducing the first reproduction data and wherein the second reproduction device is configured for reproducing the second reproduction data.

Furthermore, the invention relates to a method for reproducing first reproduction data and for reproducing second reproduction data, wherein a first reproduction device and at least one second reproduction device are provided, wherein first reproduction data are reproduced using the first reproduction device and wherein second reproduction data are reproduced using the second reproduction device.

BACKGROUND

When reproducing reproduction data—in particular television program contents or else VoD contents (Video-on-Demand) received via satellite, terrestrially or via a broadband connection—provision is traditionally made for offering television program contents or other video contents to a user in a predefined sequence. Such reproduction methods and systems are sufficiently known in the prior art.

However, if there is the demand to achieve an experience that is of enhanced value for a user by comparison with the customary audiovisual reproduction (e.g., via a screen and a single loudspeaker or else a screen and a plurality of loudspeakers) of playback data or reproduction data—in particular television program contents or other video contents—by providing the user with additional information or experiences or sensory impressions, in particular also via additional devices such as, for instance, mobile telephones or other, in particular portable, communication devices, it is disadvantageous that the determination of the additional information can often be performed by a user only in a time-consuming and laborious fashion.

SUMMARY

In an embodiment, the invention provides a system for reproducing first reproduction data and for reproducing second reproduction data. The system includes: a first reproduction device, configured for reproducing the first reproduction data; and a second reproduction device, configured for reproducing the second reproduction data. The system is configured such that the first reproduction data is transmitted to the first reproduction device via a first logical communication channel and the second reproduction data is transmitted to the second reproduction device via a second logical communication channel. The second logical communication channel is different from the first logical communication channel. The system is configured such that the first reproduction data is identified using pattern recognition, and determination of the second reproduction data is based on the identification of the first reproduction data.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 1 shows a schematic view of a system according to the invention comprising a first and second reproduction device.

DETAILED DESCRIPTION

Embodiments of the invention provide a system and a method for reproducing first reproduction data as video data or audio-video data and for reproducing second reproduction data as additional information, wherein the system comprises a first and second reproduction device for reproducing the first and second reproduction data, wherein a first logical communication channel is provided for transmitting the first reproduction data and a second logical communication channel is provided for transmitting the second reproduction data, wherein the second logical communication channel is different from the first logical communication channel and wherein a determination of the second reproduction data or of the additional information that is as simple and intuitive as possible is nevertheless made possible.

In an embodiment, the invention provides a system for reproducing first reproduction data and for reproducing second reproduction data, wherein the system comprises a first reproduction device and at least one second reproduction device, wherein the first reproduction device is configured for reproducing the first reproduction data and wherein the second reproduction device is configured for reproducing the second reproduction data, wherein the system is configured for transmitting the first reproduction data to the first reproduction device via a first logical communication channel and wherein the system is configured for transmitting the second reproduction data to the second reproduction device via a second logical communication channel, wherein the second logical communication channel is different from the first logical communication channel, wherein the system is configured for identifying the first reproduction data, wherein the determination of the second reproduction data is provided in a manner dependent on the identification of the first reproduction data.

It is thereby advantageously possible according to the invention that, alongside the first reproduction data provided, in particular, as multimedia content or as traditional audiovisual data, additional information or additional contents can be reproduced as second reproduction data in a manner that is advantageous, in particular pleasant or otherwise beneficial, for the user, wherein the system is configured for transmitting the first reproduction data to the first reproduction device via the first logical communication channel and for transmitting the second reproduction data to the second reproduction device via the second logical communication channel, wherein the second logical communication channel is different or differs from the first logical communication channel. It is thereby possible according to the invention, in particular, that the first and second reproduction data can be transmitted separately from one another. However, the invention provides, in particular, for the second reproduction data to be related to the first reproduction data with regard to their reproduction, but for the first and second reproduction data otherwise to be independent of one another.

In particular, the relativeness of the second reproduction data (or of the additional information) to the first reproduction data means that—in a manner analogous to the first reproduction data and a first reproduction data stream that can be generated therefrom—a second reproduction data stream can be generated from the second reproduction data, wherein the second reproduction data stream, expediently or for increasing the benefit for a user, is intended to be reproduced in a manner related to the first reproduction data (or the first reproduction data stream) in such a way that corresponding locations of the first reproduction data and of the second reproduction data either correspond exactly or else correspond at least approximately, i.e. are reproduced in substantially synchronized fashion. The expression "reproduced in substantially synchronized fashion" means, in particular, either that a virtually perfect synchronization of the reproduction of the first and second reproduction data (i.e. for instance a deviation of the two data streams in the range of less than 100 milliseconds, for example, or particularly preferably of less than 10 milliseconds, or with further preference of less than 1 millisecond) is provided or else that a relatively good synchronization of the reproduction of first and second reproduction data (i.e. for instance a deviation of the two data streams in the range of more than 100 milliseconds, but less than 10 seconds) is provided.

The invention provides for the determination of the second reproduction data to be provided in a manner dependent on the identification of the first reproduction data. That means that firstly an identification of the first reproduction data has to be performed in order to be able to make available to a user the correct second reproduction data—i.e. in particular the second reproduction data appropriately associated with the first reproduction data (and furthermore, of course, also the desired second reproduction data). In particular, for the case where the first reproduction data are a television signal, it is necessary for said television signal to be recognized, i.e. identified, and for the second reproduction data subsequently to be obtained from the desired source (of additional information). In this case, it is often laborious to determine the correct and desired information for example from a database. The invention therefore proposes that the first reproduction data be automatically recognized or identified.

According to the invention, a recognition of the channel concerning the first reproduction data, in particular of the television channel, or generally a recognition of the content of the first reproduction data is performed in order to enable the second reproduction data to be selected simply and in a manner that is intuitive for the user to perform. By way of example, it is also conceivable for the reproduction of a feature film DVD to be recognized as first reproduction data and for second reproduction data to be selected on the basis of the identification of said first reproduction data and to be transmitted to the user.

According to the invention, it is preferably provided that the system comprises a first server device and a second server device, wherein the system is provided for transmitting the first reproduction data to the first reproduction device proceeding from the first server device and wherein the system is provided for transmitting the second reproduction data to the second reproduction device proceeding from the second server device.

It is thereby possible according to the invention in a particularly advantageous manner that an (at least possible) separation of the server devices corresponds to the separation of the logical communication channels. As an alternative to a separation of the server devices, however, according to the invention it may also be provided that a common server device provides both the first reproduction data and the second reproduction data, the separation or division between different logical communication channels in any case being realized with regard to the data transport. The invention is presented below, however, primarily with regard to the embodiment comprising a first server device for the first reproduction data and a second server device for the second reproduction data.

According to the present invention, furthermore, it is preferred that the system is configured for transmitting feedback data from the second reproduction device, wherein for transmitting the feedback data the system is configured
for utilizing the second logical communication channel or
for utilizing a further logical communication channel,
wherein the system is configured in particular for transmitting the feedback data to the second server device.

It is thereby possible according to the invention in a particularly advantageous manner that a flexible return channel can be provided, such that, in particular, interactive contents can be transmitted via the second reproduction data and for the user there is a possibility of reacting to a first part (sent at an earlier first point in time) of the second reproduction data (by transmitting feedback data), wherein the feedback data in turn influence a second part (sent at a later second point in time) of the second reproduction data, i.e. wherein the further second reproduction data are dependent on the feedback data. For example, it is advantageously possible according to the present invention that, via the second reproduction data, the second reproduction device displays (e.g. at the end of a movie (as first reproduction data) and/or at the end of an advertising spot or a commercial (as first reproduction data) or at another point in time during and/or after the transmission of the first reproduction data) a request (i.e. a first part of the second reproduction data) to provide feedback by a user such that the user is able to, e.g., participate in playing a quiz show, e.g. by providing an answer corresponding to a question of the quiz show, or provide another kind of feedback, e.g. an evaluation (such as "I like" or "I do not like" or a value from one to, e.g., ten) of the movie or the advertising spot. In such manner, it is advantageously possible according to the present invention that feedback data can be transmitted easily and in a convenient manner (especially more convenient than, e.g., sending an SMS message) for the user of the first and second reproduction device.

It is preferred according to a preferred embodiment of the present invention, that the feedback information comprises reference information, the reference information being provided for referring to a specific portion of the first reproduction data. Preferably, the reference information is time stamp information comprising the point in time when the feedback information is provided by the user (via the second reproduction device) and thereby indicating (or referring to) a specific portion of the first reproduction data, especially a specific scene or part or episode. Alternatively, the reference information comprises identifier information, identifying the specific portion of the first reproduction data.

Thereby, it is advantageously possible according to the present invention that via the reference information, the value of the feedback information can be increased as it is possible to correlate the feedback information with a specific part of the first reproduction data, i.e. to have the feedback data focused on the specific part of the first reproduction data. Thereby, it is furthermore advantageously possible that the user provides (e.g. during the time of a movie of, e.g., 100 minutes or the like, or during a sequence of advertising spots) a multitude of pieces of feedback information, and nevertheless the multitude of pieces of feedback information can be assigned (using the reference information) to the respective specific portion of the first reproduction data, i.e. for example to one of the advertising spots or to one of the different scenes of a movie.

According to the invention, it is furthermore preferably provided that the system comprises a receiver device connected to the first reproduction device, wherein the system is configured for transmitting the first reproduction data from the first server device to the receiver device and from the receiver device to the first reproduction device.

A particularly flexible realization of the present invention that is adapted to different user requirements or to different configurations, for instance of a user's device, is thereby possible.

In particular, according to the invention it is preferably provided that for identifying the first reproduction data the system is configured for transmitting identification data to the second reproduction device.

It is thereby advantageously possible to incorporate the second reproduction device actively into the reproduction process. In particular, it is thus advantageous that it is only in such situations in which the second reproduction data are actually required for use or are requested (with the active participation of the second reproduction device) that said data also have to be provided, with the result that unused network loading can be avoided.

According to the invention, it is furthermore preferably provided that the identification data transmitted to the second reproduction device for identifying the first reproduction data are part of the reproduction of the first reproduction data by the first reproduction device.

According to the invention, a recognition of the channel concerning the first reproduction data, in particular of the television channel, or generally a recognition of the content of the first reproduction data is performed in order to enable the second reproduction data to be selected simply and in a manner that is intuitive for the user to perform. In this case, according to the invention, the method used for recognizing the channel or the content of the first reproduction data can use the first reproduction data in several ways:

In accordance with a first variant of the recognition of the first reproduction data or the recognition of the content of the first reproduction data, provision is made for deducing the content of the first reproduction data via the acoustic content of the first reproduction data, i.e. via the acoustic information for instance in a room (for the reproduction), and for realizing the recognition of said first reproduction data. In this case, it is in particular preferably provided that a part of the acoustic effect of the reproduction of the first reproduction data is detected by the second reproduction device and subjected to a pattern recognition. In this case, in particular the use of a pattern recognition platform, for example of a network operator, is provided. Using the pattern recognition platform, by way of example, the acoustic signals picked up by the second reproduction device are compared with patterns of the current television program in order thus to deduce the channel of the first reproduction data and hence to recognize or identify the latter. In the case of time-shifted television it is possible to recognize and take account of the time difference.

In accordance with further variants of the recognition of the first reproduction data or the recognition of the content of the first reproduction data, provision is made for deducing the content of the first reproduction data via the video content or via both the acoustic and the video content of the first reproduction data, i.e. via the video information (for instance on a screen) or via both the acoustic information for instance in a room (for the reproduction) and the video content, and for realizing the recognition of said first reproduction data. In this case, it is likewise preferably provided that a part of the video reproduction or else a part of the acoustic and video reproduction of the first reproduction data is detected by the second reproduction device and is subjected to a pattern recognition.

In still a further embodiment, the first reproduction data is identified preferably by the second reproduction device or more preferably by the first server device and/or the second server device or even more preferably by the second reproduction device or still even more preferably by the first server device and/or the second server device and/or the second reproduction device, in particular via pattern recognition, e.g., using a pattern recognition platform, which, by way of example, is provided by a network operator. In particular, the first reproduction data is identified via the audio and/or the video content of the first reproduction data.

Preferably, the audio content of the first reproduction data is converted into an acoustic signal and/or the video content of the first reproduction data is converted into a visual signal, which can then be detected and identified by the second reproduction device, in particular using pattern recognition. More preferably, the audio and/or video content of the first reproduction data is identified by the first server device and/or the second server device using pattern recognition applied to an audio and/or video signal of the audio and/or video content of the first reproduction data. Even more preferably, the audio and/or video content of the first reproduction data is identified by the first server device and/or the second server device using pattern recognition applied to the acoustic and/or visual signal of the audio and/or video content of the first reproduction data. This means that for the second reproduction device to identify the first reproduction data using pattern recognition, it is preferred that the content of the first reproduction data is converted into, for example, sound waves or moving images. According to the invention, it is furthermore preferably provided that the identification data transmitted to the second reproduction device for identifying the first reproduction data comprise
  an identification of the receiver device and/or
  an identification of the first reproduction device and/or
  an identification of the first reproduction data.

It is thereby advantageously possible according to the invention that, with comparatively lower technical recognition outlay (in comparison with the recognition of acoustic information or video information or acoustic and video information), an unambiguous recognition of the first reproduction data is possible, in particular if they are such first reproduction data whose reproduction is determined in a temporally comparatively narrow range by the first server device, as is the case in particular for IPTV television programs. This is because in this situation the server device at the IPTV operator (i.e. the first server device) knows which receiver device is currently receiving which television channel, with the result that an identification of the first reproduction data is possible via the identification of the receiver device (or of the first reproduction device).

As an alternative to including the second reproduction device in the process of identifying the first reproduction data, however, according to the invention—precisely for the discussed case of an IPTV television program where the server device at the IPTV operator (i.e. the first server device) knows which receiver device (i.e. which first reproduction device) is currently receiving which television channel—it may also be provided that a server-side recognition of the first reproduction data is provided. The IPTV operator can identify, for example on the basis of the connection identifier, the customer (and thus the first reproduction data), on the basis of which the second reproduction data can be determined. For the case where the IPTV operator also occurs as operator of the customer's Internet connectivity functionality or else as operator of the customer's mobile radio connectivity, a transmission possibility for the second reproduction data, i.e. for the second logical communication channel (independent of the first logical communication channel), is furthermore present as well. In particular, it is advantageous in this case that such an IPTV operator can also realize a temporal synchronization of the first reproduction data and of the second reproduction data in a simple manner, but it is generally provided according to the invention that a synchronization is provided for adjusting the first and second reproduction data transmitted via the separate first and second logical communication channels.

According to the invention, it is furthermore preferably provided that the first reproduction data comprise video data or audio-video data, in particular the program contents of a television program or of a distribution service for video data, and in that the second reproduction data are audio data corresponding to the first reproduction data or multimedia data corresponding to the first reproduction data.

It is thereby advantageously possible according to the invention that during the reproduction of the first and second reproduction data, additional benefit is generated for a user of the reproduction. According to the invention, it is provided, for example, that the second reproduction data are provided as additional data or additional information relative to the first reproduction data, for example as particular audio events which take place at specific locations of a film presentation (corresponding to the first reproduction data), for example to accompany a particularly exciting scene, for example a storm or the like, wherein at the point in time of, for example, thunder or a flash of lightening, an acoustic or a visual event (for example event perceptible to the user via a vibration on the second reproduction device, designed as a mobile telephone, or via a flash of a camera device on the second reproduction device, designed as a mobile telephone, or in some other way) is generated, for example the driving of a specific loudspeaker or else the driving of a specific lighting device, for instance the exterior lighting of a house or the like. Furthermore, the second reproduction data could comprise additional content-related information (i.e. additional information of the second reproduction data related to the content of the first reproduction data), e.g., additional information such as statistical information (such as goal statistics or other related information) regarding a sports event such as a soccer match.

The present invention further relates to a method for reproducing first reproduction data and for reproducing second reproduction data, wherein a first reproduction device and at least one second reproduction device are provided, wherein first reproduction data are reproduced via the first reproduction device and second reproduction data are reproduced via the second reproduction device, wherein the first reproduction data are transmitted to the first reproduction device via a first logical communication channel, wherein the second reproduction data are transmitted to the second reproduction device via a second logical communication channel, wherein the second logical communication channel is different from the first logical communication channel, wherein, in a first method step, an identification of the first reproduction data is carried out and wherein, in a second method step, the second reproduction data are determined in a manner dependent on the identification of the first reproduction data.

It is thereby advantageously possible according to the invention that, alongside the first reproduction data provided, in particular, as multimedia content or as traditional audiovisual data, additional information or additional contents can be reproduced as second reproduction data in a manner that is advantageous, in particular pleasant or otherwise beneficial, for the user and the first and second reproduction data are transmitted via different logical communication channels.

It is preferably provided according to the invention that a first server device and a second server device are provided, wherein the first reproduction data are transmitted to the first reproduction device proceeding from the first server device and the second reproduction data are transmitted to the second reproduction device proceeding from the second server device.

It is furthermore preferably provided according to the invention that feedback data are transmitted from the second reproduction device, wherein the feedback data are transmitted via the second logical communication channel or via a further logical communication channel, wherein the feedback data are transmitted in particular to the second server device.

Furthermore, it is also preferably provided that a receiver device connected to the first reproduction device is provided, wherein the first reproduction data are transmitted from the first server device to the receiver device and from the receiver device to the first reproduction device.

Furthermore, it is preferably provided according to the invention that identification data for identifying the first reproduction data are transmitted to the second reproduction device.

Furthermore, it is also preferably provided that the identification data transmitted to the second reproduction device for identifying the first reproduction data are generated during the reproduction of the first reproduction data by the first reproduction device.

Furthermore, the present invention also relates to a computer program comprising program code means with the aid of which all the steps of the method according to the invention can be carried out if the computer program is executed on a programmable electrical device or a component of the system.

Furthermore, the present invention relates to a computer program product comprising a computer-readable medium and a computer program stored on the computer-readable medium and comprising program code means suitable to the effect that all the steps of the method according to the invention can be carried out if the computer program is executed on a programmable electrical device or a component of the system.

Further details, features and advantages of the invention are evident from the drawings, and from the following description of preferred embodiments with reference to the drawings. In this case, the drawings merely illustrate exemplary embodiments of the invention which do not restrict the essential concept of the invention.

FIG. 1 schematically illustrates a view of a system 10 according to the invention comprising a first reproduction device 21 and a second reproduction device 22.

Furthermore, the system 10 in the embodiment illustrated in FIG. 1 comprises a first server device 11, a second server device 12 and a receiver device 13.

In accordance with the embodiment illustrated in FIG. 1, first reproduction data 31 are transmitted from the first server device 11 for reproducing the first reproduction data 31 towards the first reproduction device 21. Furthermore, in accordance with the embodiment illustrated in FIG. 1, a receiver device 13 is present, which receives the first reproduction data 31 from the first server device 11 and transmits them to the first reproduction device 21. However, this design should be understood merely by way of example.

The first reproduction data 31 are transmitted from a data source, namely the first server device 11, to a receiver of the data, namely the first reproduction device 21. For this purpose, a first logical communication channel 41 is provided between the first server device 11 and the first reproduction device 21, wherein the receiver device 13 can be provided, but need not necessarily be present. The receiver device 13 should therefore be regarded as merely optional, that is to say that, in accordance with other embodiments (not illustrated), it may also be provided that no receiver device 13 is arranged between the first server device 11 and the first reproduction device 21.

According to the invention, second reproduction data 32 are transmitted to a second reproduction device 22 for the purpose of the second reproduction data 32 being reproduced by the second reproduction device 22. The second reproduction data 32 are additional information or additional data supplementing the first reproduction data 31. For transmitting the second reproduction data 32, a second logical communication channel 42 is provided between a second server device 12 and the second reproduction device 22.

With regard to the transmission of the first reproduction data 31, the example illustrated in FIG. 1 relates for instance to the transmission of the first reproduction data 31 as an IPTV signal (Internet Protocol TV signal) via a broadband network or a broadband access network to a household and there, in particular, to a television set or some other monitor device as first reproduction device 21. In this situation, the first logical communication channel 41 typically comprises a receiver device 13 in the form of a router device or a network connection device for linking a private household to a broadband network. In this case, for instance, the coupling-in device of the IPTV signal for distribution by the broadband network or the broadband access network corresponds to the first server device 11.

Furthermore, with regard to the transmission of the first reproduction data 31, the example illustrated in FIG. 1 alternatively relates to the situation of transmission of the first reproduction data 31 to the first reproduction device 21 on the basis of satellite reception (for instance in accordance with the DVB-S standard, Digital Video Broadcasting-satellite) or on the basis of terrestrial reception (for instance in accordance with a DVB-T standard, Digital Video Broadcasting-terrestrial) of a television signal, for instance. In this situation, the first logical communication channel 41 comprises a receiver device, which, however, is typically designed in a manner integrated in the reproduction device 21. In this case, for instance, the coupling-in device of the television signal for distribution by the satellite or for distribution via terrestrial antennas corresponds to the first server device 11.

Furthermore, with regard to the transmission of the first reproduction data 31, the example illustrated in FIG. 1 alternatively furthermore relates to the situation of the presence of the first reproduction data 31 in a spatially relatively close range of the first reproduction device 21, for example on an optical data carrier or on a hard disk (or on some other data carrier). In this case, the first logical communication channel 41 merely comprises the path between the local data carrier (which functions as the first server device 11 in this configurational case) and the first reproduction device 21.

According to the invention, the first logical communication channel 41 and the second logical communication channel 42 differ from one another. This means that the first and second reproduction data 31, 32 are transmitted (at least logically) independently of one another. In particular, it is provided according to the invention that the first reproduction data 31 are transmitted to the first reproduction device 21 via a (wire-connecting) broadband network and the second reproduction data 32 are transmitted to the second reproduction device 22 via a mobile radio network. However, it may also be provided that the first reproduction data 31 are transmitted to the first reproduction device 21 via a (wire-connecting) broadband network and the second reproduction data 32 are also transmitted to the second reproduction device 22 via a (wire-connecting) broadband network, wherein the first reproduction data 31 are transmitted for example as an IPTV signal (i.e. as a signal which is sent to the first reproduction device 21 in the context of making available an IPTV functionality) and the second reproduction data 32 are transmitted as an Internet signal (i.e. as a signal which is sent to the second reproduction device 22 in the context of making available an Internet connectivity functionality), such that it is conceivable for both the first reproduction data 31 and the second reproduction data 32 to be passed (at least via a partial path) via the same physical channel (in particular from, for example, an access point (used both for the IPTV functionality and for the Internet connectivity functionality) of a (wire-connecting) broadband network to the receiver device 13). In such a configurational case of a physical (at least partial) identity of the physical transmission channel of the first reproduction data 31 and of the second reproduction data 32, the feature of the separation or the difference of the first logical communication channel 41 from the second logical communication channel 42 is also realized.

With regard to the transmission of the second reproduction data 32, the example illustrated in FIG. 1 relates, for instance, to the transmission of the second reproduction data 32 as a signal transmitted via a mobile radio network to a portable device, in particular as a mobile telephone or as some other, in particular portable, telecommunication terminal, as a second reproduction device 22. In this case, for instance, the coupling-in device of the signal corresponding to the second reproduction data 32 for transmission by the mobile radio network corresponds to the second server device 12.

Furthermore, with regard to the transmission of the second reproduction data 32, the example illustrated in FIG. 1 alternatively relates to the situation of transmission of the second reproduction data 32 to the second reproduction device 22 on the basis of an Internet signal via a broadband network or a broadband access network to a household and there, in particular, to a portable device, in particular as a mobile telephone or as some other, in particular portable, telecommunication terminal, as the second reproduction device 22. In this situation, the second logical communication channel 42 typically likewise comprises a receiver device in the form of a router device or a network connection device for linking a private household to a broadband network, wherein that receiver device which is used for the second reproduction data 32 can also be identical to the receiver device 13 (for the first reproduction data 31). For instance, the coupling-in device of the signal corresponding to the second reproduction data 32 for transmission by the broadband network or the broadband access network corresponds to the second server device 12.

Furthermore, with regard to the transmission of the second reproduction data 32, the example illustrated in FIG. 1 alternatively furthermore relates to the situation of the presence of the second reproduction data 32 in a spatially relatively close range of the second reproduction device 22, for example on an optical data carrier or on a hard disk (or on some other data carrier). In this case, the first logical communication channel 42 merely comprises the path between the local data carrier (which functions as the second server device 12 in this configurational case) and the second reproduction device 22.

An identification of the first reproduction data 31 using identification data 33 is preferably provided according to the invention. This identification of the first reproduction data 31 (depending on which the second reproduction data 32 can be determined) can be effected in various ways according to the invention. In particular, it is preferably provided and advantageous that the second reproduction device 22 is actively incorporated into the reproduction process. This can be done, for example, by virtue of the fact that the identification data 33 transmitted to the second reproduction device 22 for identifying the first reproduction data 31 are part of the reproduction of the first reproduction data 31 by the first reproduction device 21.

In accordance with a first variant of the recognition of the first reproduction data 31 or the recognition of the content of the first reproduction data 31, provision is made for deducing the content of the first reproduction data via the acoustic content of the first reproduction data 31, i.e. via the acoustic information for instance in a room (for the reproduction), and for realizing the recognition of said first reproduction data. The identification data 33 thus comprise at least part of the acoustic information of the first reproduction data 31. In this case, it is in particular preferably provided that a part of the acoustic effect of the reproduction of the first reproduction data 31 is detected by the second reproduction device 22 and is subjected to a pattern recognition—in particular the use of a pattern recognition platform, for example of a network operator. In the case of time-shifted television, in this way it is also possible comparatively simply to recognize and take account of a user-chosen time difference (for instance between the point in time of sending and the point in time of reproducing the first reproduction data 31).

In accordance with further variants of the recognition of the first reproduction data or the recognition of the content of the first reproduction data 31, it is provided that, instead of the acoustic content of the first reproduction data 31, the video content or else both the acoustic content and the video content of the first reproduction data 31 is/are used (i.e. is/are part of the identification data 33) and transmitted to the second reproduction device 22.

Furthermore, it is also possible and provided according to the invention that the identification data 33 transmitted to the second reproduction device 22 for identifying the first reproduction data 31 comprise an identification of the receiver device 13 and/or an identification of the first reproduction device 21 and/or an identification of the first reproduction data 31.

As an alternative to including the second reproduction device in the process of identifying the first reproduction data 31, however, according to the invention it may also be provided that a server-side recognition of the first reproduction data is provided, i.e. accordingly the identification data 33 are not transmitted between the first reproduction device 21 and the second reproduction device 22, but rather as it were between the first server device 11 and the second server device 12. However, this embodiment is not illustrated in FIG. 1. By way of example, an IPTV operator, for instance on the basis of the connection identifier, can identify the customer or the user (and hence the first reproduction data 31), with the result that the second reproduction data 32 can be determined.

Hence, the identification of the first reproduction data 31 is preferably performed by the first server device 11 and/or the second server device 12 and/or the second reproduction device 22 using pattern recognition, in particular of the audio and/or video content of the first reproduction data 31.

More preferably, the pattern recognition makes use of a pattern recognition database. In particular, the pattern recognition is based on calculating a signal correlation, for example of an audio and/or video signal of the first reproduction data 31, with a reference signal being stored in a database, for example the pattern recognition database. The audio and/or video signal, in particular an acoustic or a visual signal, is compared to the reference signal and recognized if the match between the audio and/or video signal and the reference signal is sufficiently good, meaning that the correlation calculation yields a positive result. Such a correlation calculation yields a degree of similarity between the original signal, for example the audio and/or video signal, and the reference signal. In particular, the degree of similarity is given by a scalar value between 0 and 1, wherein for example 1.0 represents a total match between the original signal and the reference signal and wherein for example 0.0 represents a total dissimilarity. Preferably, a certain scalar value is set as a lower threshold for a positive result, i.e. a match. In particular, this threshold is 0.5 or 0.7 or 0.3. If the correlation calculation yields a value greater than this threshold value, the signals being compared are treated as a match and if the value is lower than this threshold value, the signals are treated as a mismatch.

According to the invention, it is furthermore preferably provided that feedback data 34 are transmitted from the second reproduction device 22 and temporally successive second reproduction data 32 are influenced by the feedback data 34. According to the invention, the feedback data 34 are received, in particular, by the second server device 12, wherein the use of the second logical communication channel 42 can be provided for transmitting the feedback data 34, but it is also possible to use a further logical communication channel. By virtue of the possibility of transmitting and taking account of the feedback data 34 for the further sequence of the second reproduction data 32, it is advantageously possible according to the invention that a flexible return channel can be provided, such that, in particular, interactive contents can be transmitted using the second reproduction data 32 and for the user there is a possibility of reacting to a first part (sent at an earlier first point in time) of the second reproduction data 32 (by transmitting the feedback data 34), wherein the feedback data 34 in turn influence a second part (sent at a later second point in time) of the second reproduction data 32, i.e. the further second reproduction data 32 being dependent on the feedback data 34.

Some examples of the second reproduction data 32 are indicated below:

In the case of quiz broadcasts it is possible that—for example on a mobile radio device—an interactive user interface (as part of the second reproduction data 32) is displayed, using which the user, in parallel with the quiz broadcast transmitted as a television signal, can participate in answering quiz questions. Furthermore, in such a configuration it may also be provided that under remote control (i.e. in a manner initiated using the second reproduction data 32, which in this case also comprise control data for controlling the second reproduction device 22) actions such as, for instance, switching on a microphone and/or a camera (in particular on the second reproduction device 22) are initiated and, consequently, for instance quiz candidates can be integrated into the broadcast virtually live via the second reproduction device 22.

Furthermore, for instance during the reproduction of feature films as first reproduction data 31, it is provided that—in particular in real time—appropriate noises, colours or images are transmitted to the second reproduction device 22. Furthermore, functions such as a vibration, for instance, could also be activated at the second reproduction device 22 as part of the second reproduction data 32, precisely during particularly exciting moments of the reproduction or else during reproduction of an advertisement.

Furthermore, it is possible according to the invention that, in the case of cinema goers, an enhanced feature film experience is realized by virtue of supporting contents (for instance noises or vibrations (in particular of mobile radio telephones)) being sent to the mobile radio devices of the cinema goers.

Furthermore, it is possible according to the invention that, in case, e.g., of sport events transmitted, the second reproduction data 32 comprise additional content-related information (i.e. additional information of the second reproduction data 32 related to the content of the first reproduction data 31), e.g., additional information such as statistical information (such as goal statistics or other related information) regarding a sports event such as a soccer match or the like.

Furthermore, it is also provided according to the invention that messages from the virtual world of a film reproduced by the first reproduction data 31 are transmitted to the second reproduction device 22, for example a personalized SMS message from an actor (or a character in the reproduced film), in particular in real time. Greater immersion of a viewer in the reproduced film is therefore possible according to the invention.

According to the invention, the information of, in particular, the identification data 33 and/or of the feedback data 34 can advantageously also be used for determining viewing figures and viewers' behaviour. Furthermore, it is advantageously possible according to the invention to realize a bonus system, for instance in such a way that after the reproduction of a specific number of specific broadcasts a user is promised a monetary or other advantage (for example a music voucher for procuring a music file).

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A system for reproducing first reproduction data and for reproducing second reproduction data, wherein the system comprises:
   a first reproduction device, configured for reproducing the first reproduction data; and
   a second reproduction device, configured for reproducing the second reproduction data;
   wherein the system is configured such that the first reproduction data is transmitted to the first reproduction device via a first logical communication channel and the second reproduction data is transmitted to the second reproduction device via a second logical communication channel, wherein the second logical communication channel is different from the first logical communication channel;
   wherein the system is configured such that the first reproduction data is identified using pattern recognition, and determination of the second reproduction data is based on the identification of the first reproduction data; and
   wherein the system further comprises:
   a first server device, configured to transmit the first reproduction data to the first reproduction device; and
   a second server device, configured to transmit the second reproduction data to the second reproduction device;
   wherein the first server device and/or the second server device and/or the second reproduction device is configured to perform the identification of the first reproduction data using pattern recognition, wherein using pattern recognition comprises calculating a degree of similarity between an original signal and a reference signal and determining whether the calculated degree of similarity is greater than a threshold degree of similarity.

2. The system according to claim 1, wherein the second reproduction device is further configured to transmit feedback data to the second server device via the second logical communication channel or a further logical communication channel.

3. The system according to claim 1, further comprising:
   a receiver device connected to the first reproduction device, wherein the first server device is configured to transmit the first reproduction data to the first reproduction device via the receiver device.

4. The system according to claim 1, wherein the identification of the first reproduction data is based on identification data transmitted to the second reproduction device, wherein the identification data is part of the first reproduction data.

5. The system according to claim 1, wherein the identification of the first reproduction data is based on identification data transmitted to the second reproduction device, wherein the identification data is at least one of:
- an identification of the receiver device;
- an identification of the first reproduction device; or
- an identification of the first reproduction data.

6. The system according to claim 1, wherein the first reproduction data comprises video data or audio-video data, and wherein the second reproduction data comprises audio data corresponding to the first reproduction data or multimedia data corresponding to the first reproduction data.

7. The system according to claim 6, wherein the video data or audio-video data of the first reproduction data comprises program contents of a television program or of a distribution service for video data.

8. A method for reproducing first reproduction data and for reproducing second reproduction data, the method comprising:
- receiving, by a first reproduction device, the first reproduction data via a first logical communication channel;
- reproducing, by the first reproduction device, the first reproduction data;
- identifying, by a first server device and/or a second server device and/or a second reproduction device, the first reproduction data using pattern recognition, wherein using pattern recognition comprises calculating a degree of similarity between an original signal and a reference signal and determining whether the calculated degree of similarity is greater than a threshold degree of similarity;
- determining the second reproduction data based on the identification of the first reproduction data;
- receiving, by the second reproduction device, the second reproduction data via a second logical communication channel, wherein the second logical communication channel is different from the first logical communication channel; and
- reproducing, by the second reproduction device, the second reproduction data.

9. The method according to claim 8, wherein the first reproduction data is transmitted to the first reproduction device from a first server device and the second reproduction data is transmitted to the second reproduction device from the second server device.

10. The method according to claim 9, further comprising:
- transmitting, by the second reproduction device, feedback data to the second server device via the second logical communication channel or via a further logical communication channel.

11. The method according to claim 8, wherein identifying the first reproduction data is based on identification data transmitted to the second reproduction device, and wherein the identification data is generated during reproduction of the first reproduction data by the first reproduction device.

12. The method according to claim 8, wherein identifying the first reproduction data is based on identification data transmitted to the second reproduction device, and wherein the identification data comprises at least one of:
- an identification of the receiver device;
- an identification of the first reproduction device; or
- an identification of the first reproduction data.

13. The method according to claim 12, wherein the video data or audio-video data of the first reproduction data comprises program contents of a television program or of a distribution service for video data.

14. The method according to claim 8, wherein the first reproduction data comprises video data or audio-video data, and wherein the second reproduction data comprises audio data corresponding to the first reproduction data or multimedia data corresponding to the first reproduction data.

15. One or more non-transitory computer-readable media having processor-executable instructions stored thereon for reproducing first reproduction data and for reproducing second reproduction data, the processor-executable instructions comprising instructions for:
- receiving, by a first reproduction device, the first reproduction data via a first logical communication channel;
- reproducing, by the first reproduction device, the first reproduction data;
- identifying, by a first server device and/or a second server device and/or a second reproduction device, the first reproduction data using pattern recognition, wherein using pattern recognition comprises calculating a degree of similarity between an original signal and a reference signal and determining whether the calculated degree of similarity is greater than a threshold degree of similarity;
- determining the second reproduction data based on the identification of the first reproduction data;
- receiving, by the second reproduction device, the second reproduction data via a second logical communication channel, wherein the second logical communication channel is different from the first logical communication channel; and
- reproducing, by the second reproduction device, the second reproduction data.

* * * * *